United States Patent
Holt et al.

(10) Patent No.: US 9,050,875 B2
(45) Date of Patent: Jun. 9, 2015

(54) TRAILING ARM YOKE SUSPENSION WITH BRAKE ACTUATOR CLEARANCE

(71) Applicant: Ridewell Corporation, Springfield, MO (US)

(72) Inventors: Mark Holt, Springfield, MO (US); Craig Baird, Springfield, MO (US); Bruce Barton, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 0 days.

(21) Appl. No.: 14/268,819

(22) Filed: May 2, 2014

(65) Prior Publication Data

US 2014/0327220 A1    Nov. 6, 2014

Related U.S. Application Data

(60) Provisional application No. 61/819,457, filed on May 3, 2013.

(51) Int. Cl.
  *B60G 11/28*  (2006.01)
  *B60G 9/00*  (2006.01)
  *B60G 7/00*  (2006.01)

(52) U.S. Cl.
  CPC  *B60G 11/28* (2013.01); *B60G 9/00* (2013.01); *B60G 2200/1322* (2013.01); *B60G 2200/31* (2013.01); *B60G 7/001* (2013.01); *B60G 9/003* (2013.01); *B60G 2200/312* (2013.01); *B60G 2202/152* (2013.01); *B60G 2204/126* (2013.01); *B60G 2204/128* (2013.01); *B60G 2206/10* (2013.01)

(58) Field of Classification Search
  CPC ...... B60G 9/00; B60G 9/003; B60G 2200/31; B60G 2200/1322; B60G 2202/152
  USPC ........ 280/124.11, 124.116, 124.128, 124.132
  See application file for complete search history.

(56) References Cited

U.S. PATENT DOCUMENTS

| | | | |
|---|---|---|---|
| 6,152,486 A | 11/2000 | Pierce | |
| 6,322,089 B1 | 11/2001 | Dantele et al. | |
| 6,805,369 B2 * | 10/2004 | Galazin | 280/124.116 |
| 6,808,192 B1 | 10/2004 | Bol | |
| 6,926,122 B2 | 8/2005 | Wittlinger et al. | |
| 7,484,744 B2 | 2/2009 | Galazin et al. | |
| 7,669,866 B2 | 3/2010 | Peaker et al. | |
| 2006/0163834 A1 | 7/2006 | Brereton et al. | |
| 2011/0089660 A1 | 4/2011 | Dodd et al. | |

* cited by examiner

*Primary Examiner* — Faye M Fleming
(74) *Attorney, Agent, or Firm* — Lathrop & Gage LLP (57) ABSTRACT

An underslung trailing arm suspension assembly is disclosed for use on heavy duty low clearance trailers having a unique beam configuration to provide clearance for a transversely mounted air brake actuator connected directly to a disc brake housing. The suspension beam includes a unique plate mounted near an axle seat below an air spring mounting plate providing clearance for a disk brake actuator.

16 Claims, 12 Drawing Sheets

TRAILING ARM YOKE SUSPENSION WITH BRAKE ACTUATOR CLEARANCE

CROSS-REFERENCE TO RELATED APPLICATIONS

This application claims the benefit of U.S. patent application Ser. No. 61/819,457 filed May 3, 2013, the disclosure of which is incorporated herein by reference.

FIELD OF INVENTION

The present invention is directed to a trailing arm suspension for heavy duty low clearance vehicles having multiple axles where the beam configuration includes clearance for an air brake actuator.

BACKGROUND OF THE INVENTION

Trailing arm suspensions are widely used in the heavy duty trailer industry for over-the-road trailers and specialty trailers. Those versed in the art are familiar with the competing interests of weight, clearance, ease of installation and cost.

Trailer manufacturers look to the suspension industry to provide affordable suspension systems which can be shipped and installed by the trailer manufacturer. It is highly desirable that the suspension systems may be attached to trailer frame members without substantial customization by the trailer manufacturer. One of the challenges for suspension manufacturers to overcome is to design a suspension assembly for low clearance and specialty trailers that is capable of carrying extremely heavy loads. In particular, low clearance trailers having two or more sets of axles provide a unique and difficult problem because the low clearance necessitates a suspension system that is capable of being mounted in a very small space on a low clearance frame while maintaining adequate wheel travel and overall ground clearance required for practical applications.

Rather than the trailer manufacturer shipping a partially completed frame assembly to the suspension manufacturer for installation of a suspension system, it is highly desirable that the suspension manufacturer create a suspension unit that is mountable to the trailer frame by the trailer manufacturer. This saves substantial shipping costs that would be incurred by moving the trailer frame between the manufacturers.

As will be appreciated by those skilled in the art, one of the more difficult challenges to suspension manufacturers for low clearance trailers is the positioning and placement of air brake actuators. It is critical that a heavy haul low suspension trailer be provided with adequate braking. It is often necessary to install air-actuated disc-type brakes on at least one of the trailer axles to provide the required braking power.

While many disc brake manufacturers recommend mounting the brake actuator directly to a disc brake assembly, suspension manufacturers have developed a variety of devices to mechanically link the air brake actuator to the disc brake assembly while mounting the brake actuator to the suspension remotely from the disc brake assembly. These mechanical links include a variety of push or pull rods, trip levers and similar mechanisms.

Trailing arm suspensions come in two general configurations, overslung or underslung. An overslung trailing arm suspension includes a beam-over-axle orientation while an underslung assembly comprises a beam-under-axle configuration. For low clearance trailers underslung suspension assemblies are preferred because the underslung orientation has lower clearance capabilities.

Trailing arm suspensions can take a variety of shapes and cross sections and can either be formed from cast parts or fabricated from steel plates. Fabrication using steel plates may afford the manufacturer more flexibility in overall suspension design and typically results in lower weight than cast beam assemblies.

One of the basic component parts of a trailing arm suspension is a suspension beam, or control arm, with a connection end for fastening the beam to a trailer frame, the beam body, and axle seat for connecting the axle to the beam and a spring mount for securing a spring assembly between the beam and the vehicle frame.

A variety of methods for connecting a trailing arm suspension beam to a vehicle frame, or chassis, are known within the industry. A common fastening technique is to provide a wishbone end to the trailing arm suspension beam which is fastenable directly to the frame member by placing one arm of the wishbone on either side of the frame. A typical installation would include a bushing through a hole provided in the frame at the point of attachment, and a bolt or similar fastener passing through both arms of the wishbone and the frame bushing. The wishbone attachment method may be preferred for a trailer having multiple sets of axles as it allows the front axle to be moved forward on the frame.

Another common method for attaching a suspension beam to the vehicle frame is a suspension hanger assembly. A suspension hanger is mounted to and depends from the frame. The front portion of the suspension beam, whether cast or formed from plates, is provided with a hole traversing the width of the beam. Usually, a bushing is placed in this hole and then positioned within the hanger. A bolt or similar fastening mechanism secures the beam and associated bushing within the hanger.

The body of the beam itself can be cast or manufactured from plates. For manufactured beams, there are two general types of beam bodies. The first has two side plates, a top and bottom plate to form an open box which has a rectangular cross section. The other common type of manufactured beam is an I-beam having a single vertical plate, a top plate and bottom plate that has an I-shaped cross section. Other configurations of plates may be utilized, and the exact configuration or number of side plates is not limiting of the invention.

The axle seat portion of a suspension hanger beam generally includes a structural member attached to the beam body so that an axle can be mounted perpendicular to the beam. As mentioned above, typical beams are provided in either an underslung or overslung orientation and the axle seat is formed either at the top of the beam, the bottom of the beam or sometimes transversely through the middle of the beam to accommodate the preferred suspension orientation. For the purpose of an underslung beam axle, the axle seat is formed near or at the top plate of the beam and may comprise a C-shaped or arcuate piece of metal that is substantially mateable to the outer periphery of a vehicle axle. The axle is typically welded to the axle seat although it could be clamped or fastened by other known means.

At the second or rearward end of the beam an air spring mounting plate is generally provided. This plate provides a platform onto which the lower most portion of a resilient suspension spring is attached. The uppermost or top portion of the resilient air spring is attached to the vehicle frame or to a plate mounted on the vehicle frame. The resilient air spring contributes to limiting the vertical travel of the suspension beam and cushions or dampens the vertical beam travel. The exact orientation of the air spring mounting plate on the suspension beam is often controlled by the requisite amount of air spring travel for a specific application. One of the difficulties of trailer suspension design is finding a mounting position for the air spring mounting plate on the suspension beam that affords enough wheel travel while still accommodating the desired low trailer clearance.

Because of the compact space for mounting the trailing arm suspension beam on a low clearance trailer, it is extremely difficult and challenging to find a place to mount an air brake actuator for direct connection to a disc brake mounted on the axle spindle. Generally, the actuator cannot be placed between the suspension beam and the trailer frame because it limits or affects vertical wheel travel, effectively becoming a "stop" on the beam, or requires substantial modification to the trailer frame to allow the required travel. It is also less than desirable to mount the air brake actuator below the suspension beam because of ground clearance issues and the likelihood that the brake actuator would become damaged by contacting the road or objects on the road.

A trailing arm suspension beam assembly configured for heavy duty, low clearance trailer applications that accommodates the connection of the air brake actuator directly to the disc brake housing assembly is described herein. The instant invention includes a uniquely configured trailer arm suspension beam for the specific application, use and requirement. The trailing arm assembly is heavy duty, meets the low clearance objective of a low-boy or similar trailer and provides clearance for an air brake actuator to be mounted adjacent the suspension beam directly onto a disc brake housing assembly mounted at or near an axle spindle.

SUMMARY OF THE INVENTION

The instant invention is a unique suspension beam for use in a suspension assembly and connection to a vehicle frame, such as a low clearance heavy duty trailer having multiple axles. In a first embodiment of the invention, a suspension beam is provided having a first or forward end and a rear or second end. The suspension beam is pivotally mounted at its first end to a vehicle frame. In the first embodiment depicted in FIGS. 1-2 and 4-12, the first end comprises a wishbone or yoke configuration. The yoke configuration includes a left arm and right arm, one arm positionable on either side of the trailer frame. Generally, a hole or opening is provided in the trailer frame and a bushing is positioned within the hole. The arms of the yoke are positioned on either side of the bushing and pivotally fastened to the bushing with a bolt and nut or similar fastening mechanism.

The depicted embodiment of the beam itself includes a pair of spaced apart side plates, a top plate and bottom plate forming form a hollow box. It is to be understood that the suspension beam could be an I-beam having a single vertical plate spanning between a top and bottom plate, could have other non-rectangular cross-sections or could be a cast beam.

The depicted suspension assembly is an underslung configuration having an axle seat mounted transversely to the suspension beam at or near the top plate. In the depicted embodiment, the axle seat comprises a C-shaped or arcuate plate welded to or otherwise mounted transversely to the beam. An axle is mounted to the axle seat by weldment or other suitable means known in the industry. The axle is provided with a spindle at each end onto which the vehicle wheel and tire are mounted. Further, the axle is provided with a disc brake mounting plate near each spindle. A disc brake assembly is bolted or otherwise fastened onto this plate. The disc brake assembly comprises a housing, a disc, a caliper and brake pads as known within the industry. An air brake actuator is bolted or otherwise fastened to the disc brake assembly. As preferred by the manufacturer, the brake actuator is substantially aligned with the horizontal axis of the axle, depending no more than 45 degrees below center.

It is preferred that the brake actuator include both a service brake and parking brake. The inclusion of an actuator with both the parking brake and the service brake substantially increases the overall dimensions of that device. It is important that sufficient clearance exists to allow service, repair and replacement of the actuator.

In the first embodiment, the second or rearward end of the suspension beam, which lies to the rear of the axle seat, includes a semi-arcuate end plate. The end plate closes off the box formed from the side, top and bottom plates. An air spring mounting plate is positioned above or to the rear of the semi-arcuate end plate, and to the rear of the axle seat. The air spring mounting plate provides an attachment point for the lower surface of a resilient air spring. The top or upper portion of the air spring is attached to the vehicle frame. The resilient air spring mounting plate can be a separate piece from the top plate of the suspension beam or an extension of the top plate.

In the first embodiment, the semi-arcuate end plate of the suspension beam provides clearance for transversely mounting the air brake actuator such that the air brake actuator underlies the semi-arcuate plate.

In a second embodiment of the invention, the first end of the suspension beam is a unitary beam end for mounting into a suspension hanger assembly attached to the vehicle frame. In this configuration a suspension hanger is mounted to and depends from the vehicle frame. The first end of the suspension beam is positioned within the hanger and fastened therein with a bolt or similar mechanism. As is common in the industry, a bushing may be provided in the suspension beam.

In another configuration of the invention using either wishbone or unitary attachments to the vehicle frame, the end plate of the suspension beam is replaced with a unique ported brake actuator side plate. This ported brake actuator side plate is in partial alignment with the side plates of the suspension beam and extends below the air spring mounting plate. The plate has a large opening or port in alignment with the air brake actuator. The port accommodates movement of the brake actuator which may move inboard as the brake pads wear. Moreover, the periphery of the trailing end plate provides impact protection to the actuator.

It is to be understood that the suspension system includes two suspension beam assemblies, one positioned on either side of the vehicle with the axle spanning transversely across both beam assemblies. Any description provided herein of the trailing arm assembly applies to the mirror image suspension beam positioned at the other side of the vehicle.

DETAILED DESCRIPTION

This suspension system is designed for installation on a vehicle, such as a trailer, having a pair of substantially parallel chassis side and cross member rails forming the vehicle frame or chassis. It is understood that the suspension beam is duplicated on both sides of the chassis with the axle as well as the chassis being similarly connected to both beams. Since each suspension beam is identical, only a single beam will be described herein.

Figure 1:
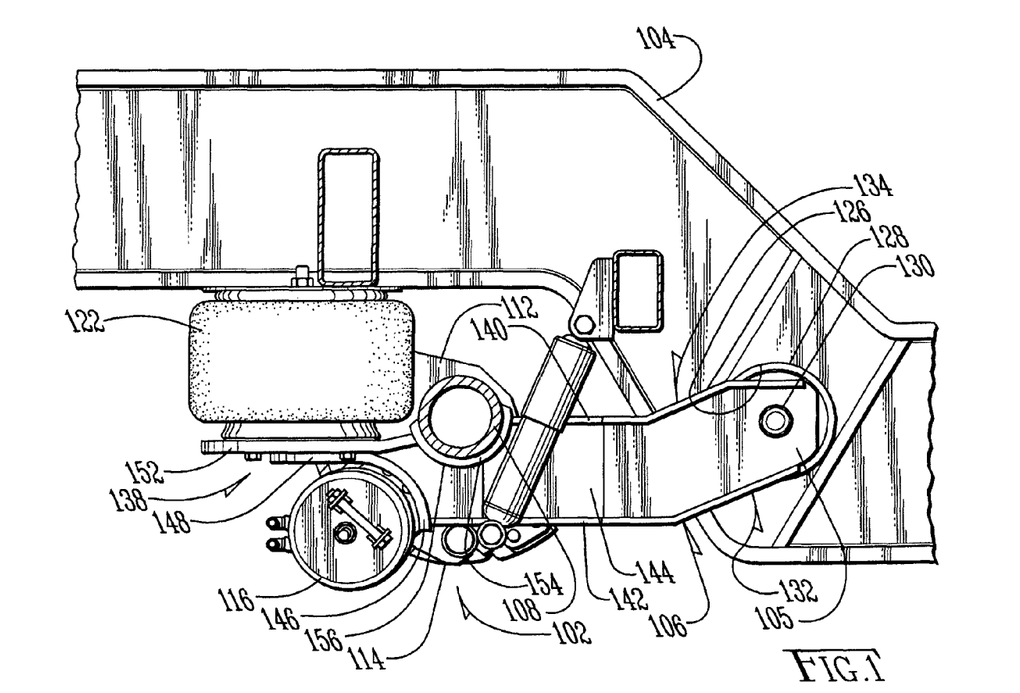
FIG. 1 is a partial side view of the first embodiment of the inventive suspension beam assembly.
Figure 2:
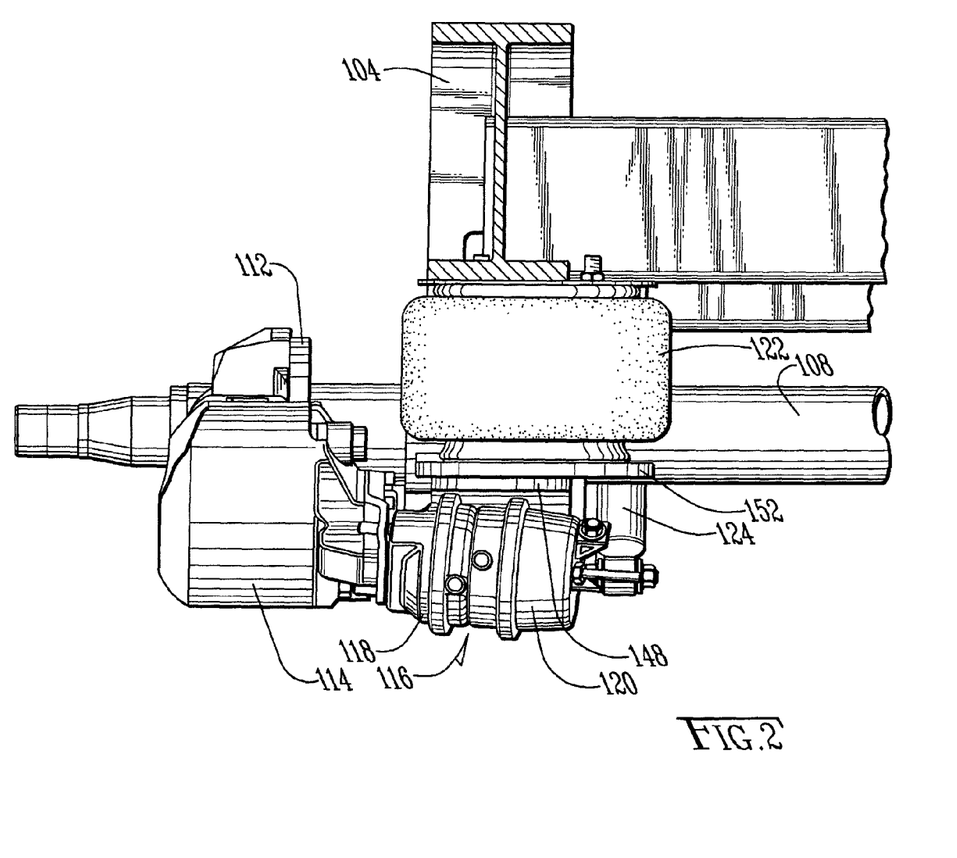
FIG. 2 is a partial end view of the first embodiment of the inventive suspension beam assembly.

Referring now generally to FIGS. 1-2 and 10-12, an embodiment of the suspension beam invention is depicted as part of a suspension assembly and independently. FIG. 1 depicts a unique suspension assembly 102 for connection to a vehicle frame 104, such as a low clearance heavy duty trailer having multiple axles. In a first embodiment of the invention, a suspension beam body 106 is provided having a first or forward end 105 and a rear or second end 138. The first end 105 is provided with a pivotal attachment for attaching the suspension beam body 106 to the vehicle frame 104. In the embodiment depicted in these figures, the first end 105 comprises a wishbone or yoke configuration 132. The yoke configuration includes a left arm 134 and right arm 136 seen most clearly in FIGS. 7-8 and 10-11, each arm positionable on opposing sides of the trailer frame 104. Generally, a hole 126 or opening is formed in the vehicle frame 104 and a bushing 128 is positioned within the hole 126. The arms 134, 136 of the yoke 132 are positioned on either side of the bushing 128 and pivotally fastened within the bushing with a bolt and nut 130 or similar fastening mechanism (not shown in FIGS. 10 and 11).

In the depicted embodiment, the beam body 106 includes a pair of spaced apart side plates 144, a top plate 140 and bottom plate 142 to form a hollow box having a rectangular cross-section. It is to be understood that the suspension beam could be an I-beam having a single vertical plate spanning between a top and bottom plate, or could be non-rectangular in cross-section.

As shown in FIGS. 1, 4-5 and 12 the suspension beam body 106 is attached to the axle 108 in an underslung configuration having an axle seat 154 mounted transversely to the beam body 106 at or near the top plate 140. In the depicted embodiment, the axle seat 154 includes a C-shaped or arcuate cup 156 welded to or otherwise mounted transversely to the beam body 106, though in other embodiments other configuration of axle seat 154 may be utilized as necessary to securely attach an axle 108 to the suspension beam.

An axle 108 is mounted to the axle seat 154 by weldment or other suitable means known in the industry. The axle 108 is provided with a spindle at each end onto which the vehicle wheel and tire assemblies (not shown) are mounted. Further, the axle 108 is provided with a disc brake housing mounting plate 112 near each spindle. A brake caliper housing 114 is bolted or otherwise fastened onto this plate 112, the brake further including a disc member and brake pads as known within the industry. An air brake actuator 116 is bolted or otherwise fastened to the disc brake housing 114 assembly and operably connected to the brake caliper. As preferred by the manufacturer, the brake actuator 116 is substantially aligned with the horizontal axis of the axle 108, depending no more than 45 degrees below center as shown in FIG. 1.

It is preferred that the brake actuator 116 include both a service brake 118 and parking brake 120. The inclusion of the parking brake 120 on the service brake 118 of the actuator 116 substantially increases the overall dimensions of the device thereby exacerbating clearance problems. It is important that sufficient clearance is provided to service, repair and replace the actuator.

In various embodiments of the suspension beam, a brake actuator clearance plate is attached to the body 106 of the suspension beam substantially beneath the air spring mounting plate 152. In the first embodiment of the suspension beam, the second or rearward end 138 of the suspension beam body 106, which lies rear of the axle seat 154, includes brake actuator clearance plate 146 which is a semi-arcuate or curvilinear end plate over the end of beam body 106. The brake actuator clearance plate, or end plate, 146 substantially closes off the box formed from the sides 144, top 140 and bottom plates 142. An air spring mounting plate 152 is positioned above or past the end plate 146 and rearward of the axle seat 154. The air spring mounting plate 152 provides an attachment point for the lower surface of a resilient air spring 122. The top or upper portion of the air spring 122 is attached to the vehicle frame. A shock absorber 124 may be provided between the suspension beam body 106 and the chassis 104.

The semi-arcuate end plate 146 may include a flat extended trailing portion 148 for mounting or connecting to the air spring mounting plate 152. The semi-arcuate end plate 146 of the suspension beam provides clearance for transversely mounting the air brake actuator 116 such that the air brake actuator underlies the semi-arcuate plate 146 as shown in the figures. The shape of plate 146 is complementary to the outer periphery of the air brake actuator 116 with enough clearance provided to avoid contact between the plate and the actuator and to allow service or replacement access to the actuator. Exact plate geometry may vary for specific suspension applications and brake actuator dimensions. The resilient air spring mounting plate 152 may be a separate piece from the top plate 140 of the suspension beam or may merely be an extension of the top plate.

Figure 3:
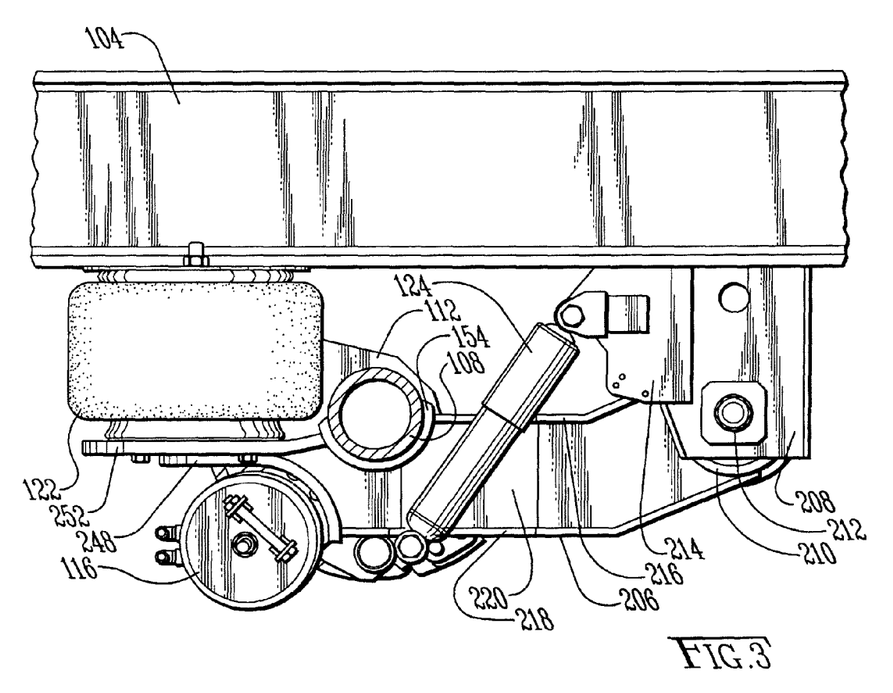
FIG. 3 is a side elevation view of a second embodiment of the inventive suspension beam assembly.

FIG. 3 depicts a second embodiment of the suspension beam having a unitary beam end for mounting into a suspension hanger assembly. In this configuration a suspension hanger 208 is mounted to and depends from the vehicle frame 104. The first end of the suspension beam 206 is positioned within the hanger 208 and fastened therein with a bolt 212 or similar mechanism. A bushing 210 may be provided in the suspension beam 206 for an improved pivotal attachment to the hanger 208. In other respects, the second embodiment of the suspension beam is similar to the embodiment described in relation to FIG. 1, including axle seat 154, beam with side plates or center plate (if I-beam construction) 220, top plate 216, bottom plate 218, and curvilinear end plate 248 to provide space for the air brake components.

Figure 4:
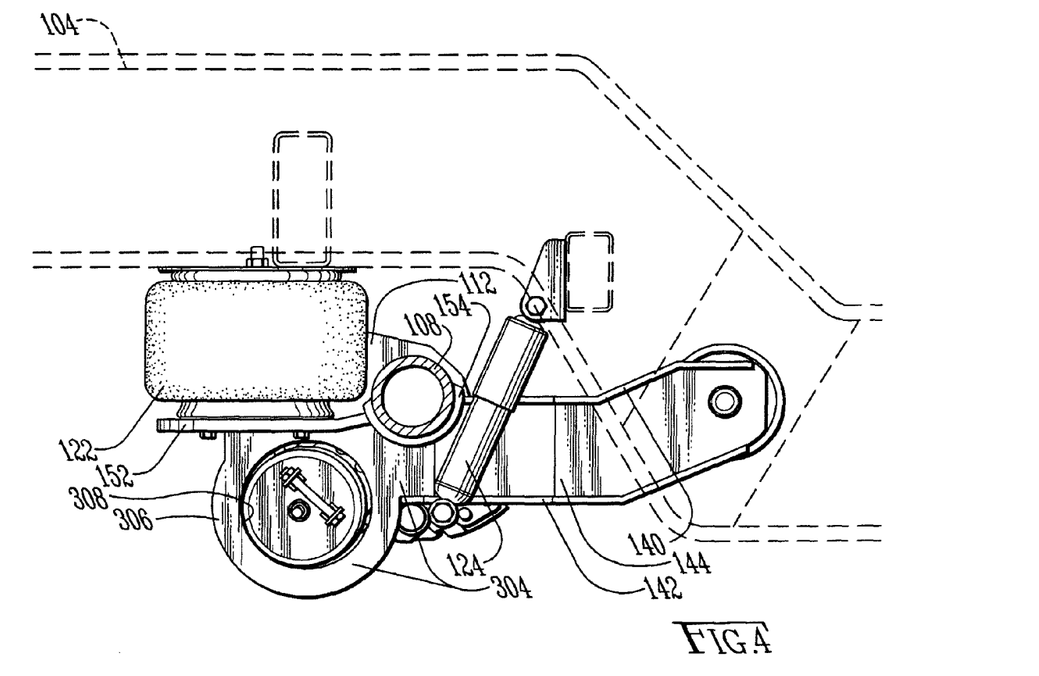
FIG. 4 is a side elevation view of a third embodiment of the inventive suspension beam assembly.
Figure 5:
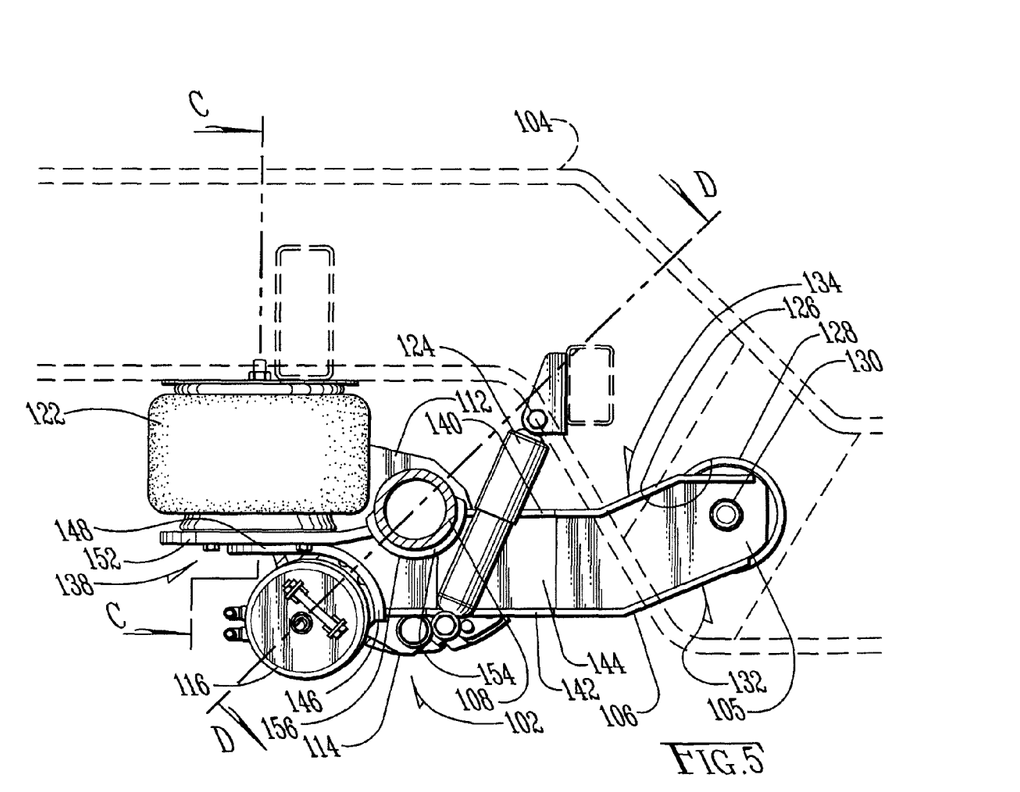
FIG. 5 is a side plan view of the first embodiment of the inventive suspension beam assembly.

Referring now to FIG. 4, a third embodiment of the suspension beam is depicted. In the third embodiment, the brake actuator clearance plate comprises a unique ported brake actuator side plate 304. This side plate 304 is in partial vertical alignment with the side plates of the beam body 106, or the vertical plate in an I-beam configuration, and extends below the air spring mounting plate 152. The side plate 304 has a large opening or port 308 in alignment with the air brake actuator 116. The port 308 accommodates movement of the brake actuator 116 which may move inboard as the brake pads wear. Moreover, the periphery 306 of side plate 304 provides impact protection to the actuator 116. The third embodiment may be utilized with yoke, unitary or other methods of pivotal attachment of the beam body 106 to vehicle frame 104.

Figure 6:
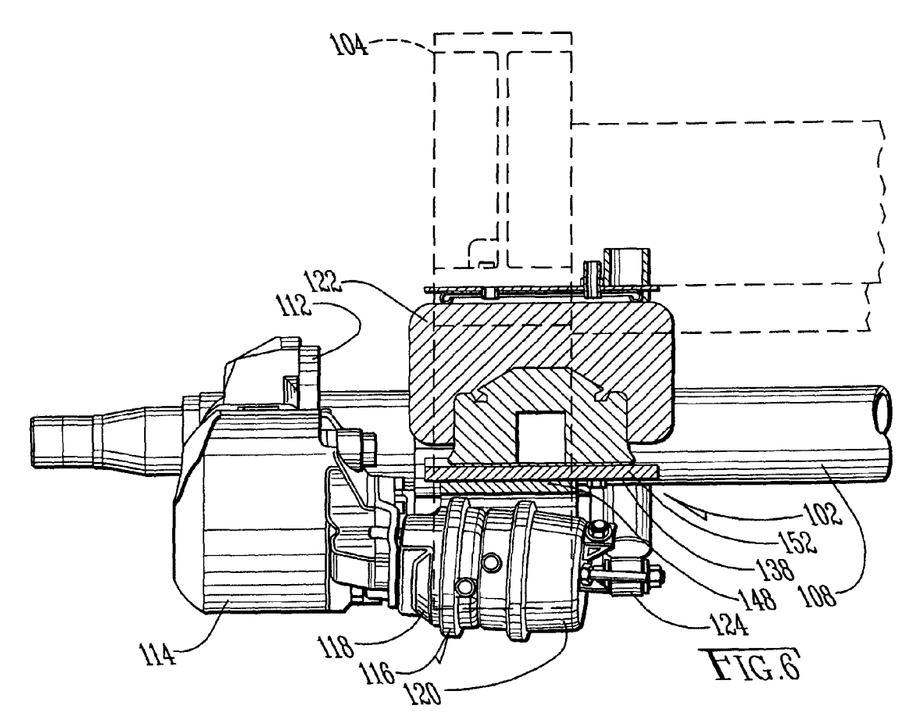
FIG. 6 is a cross sectional view taken along line C-C of FIG. 5.
Figure 7:
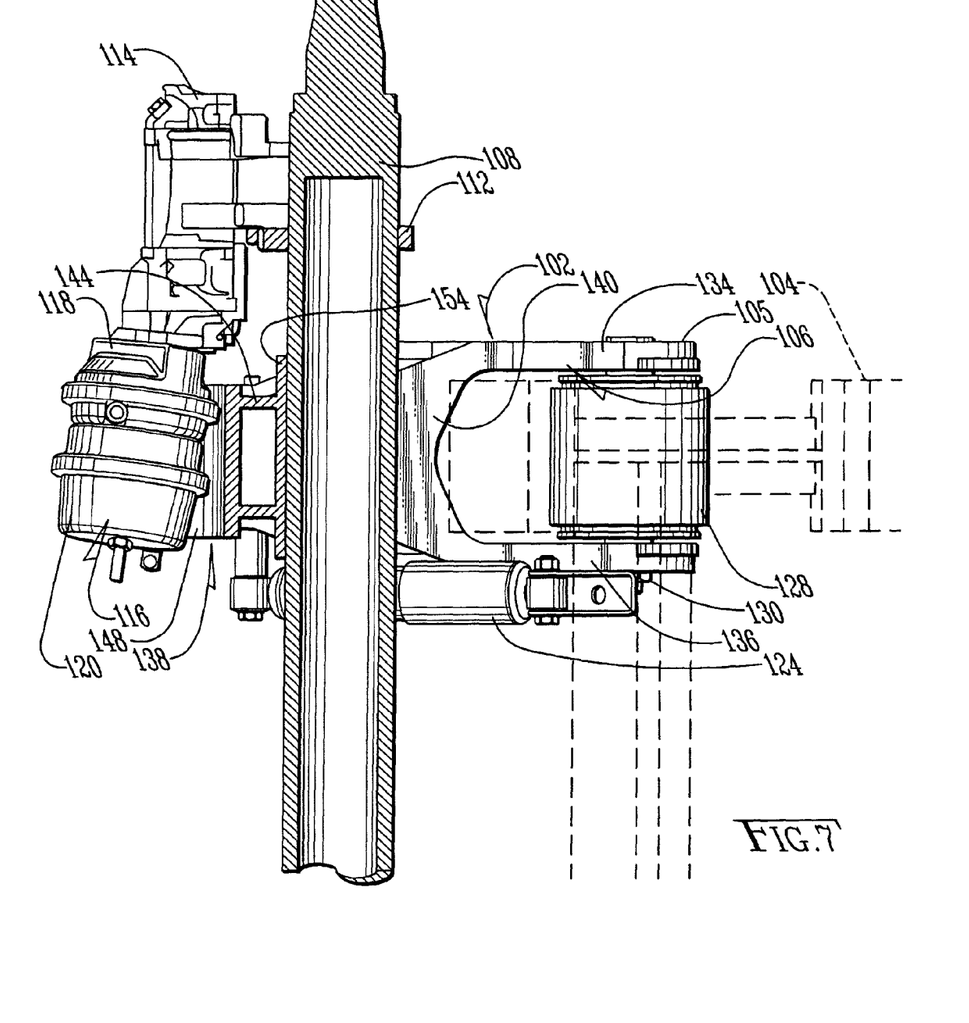
FIG. 7 is a cross sectional view taken along line D-D of FIG. 5.
Figure 8:
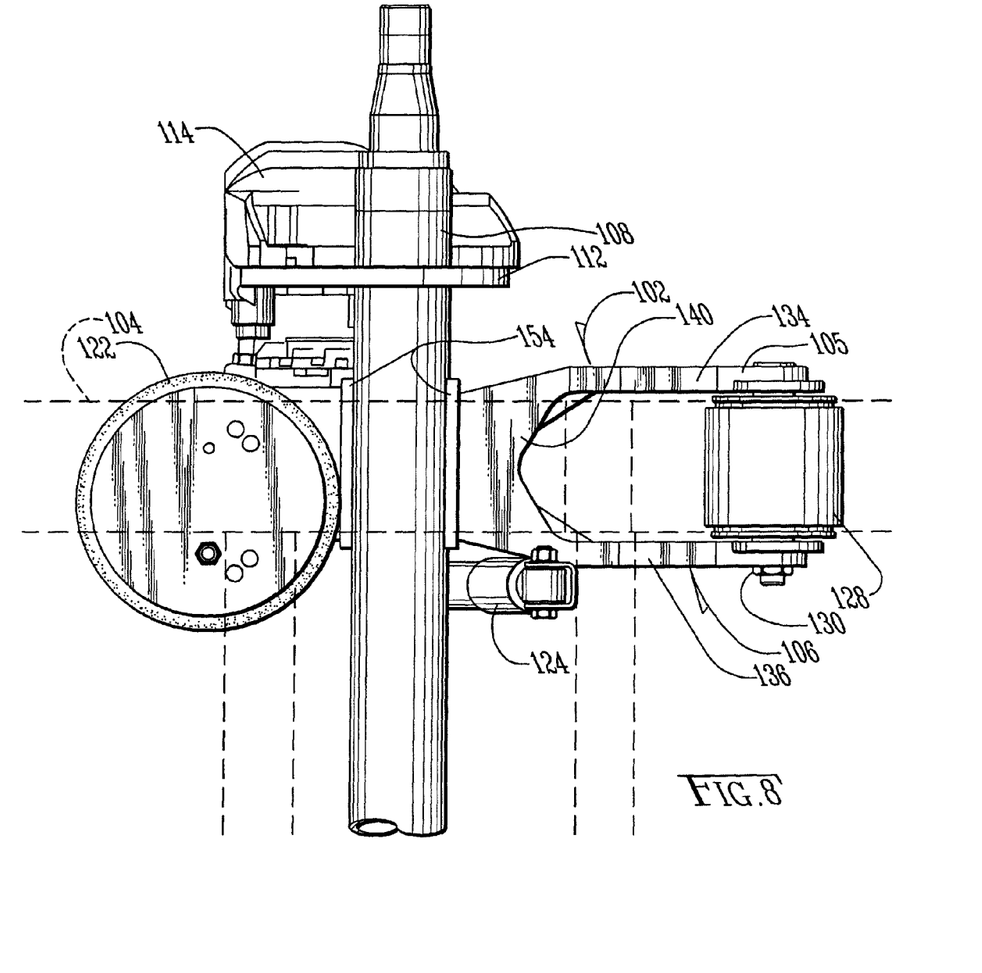
FIG. 8 is a top plan view of the first embodiment of the inventive suspension beam assembly.
Figure 9:
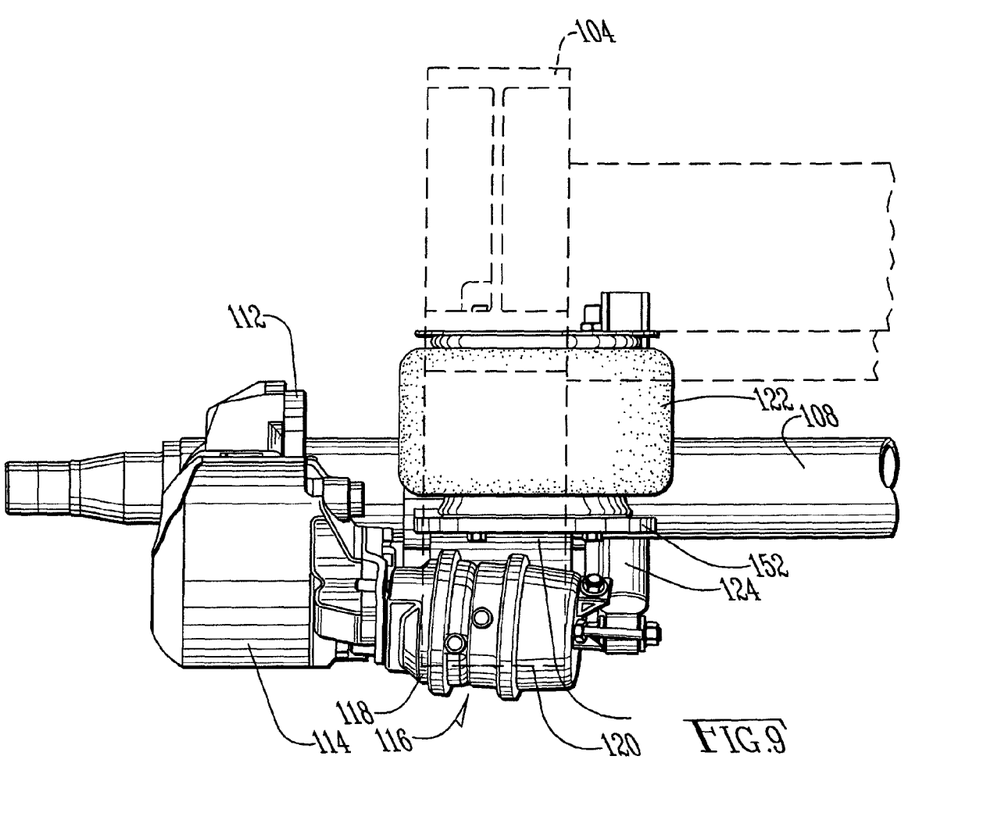
FIG. 9 is a partial cutaway end view of an embodiment of the inventive suspension beam assembly.
Figure 10:
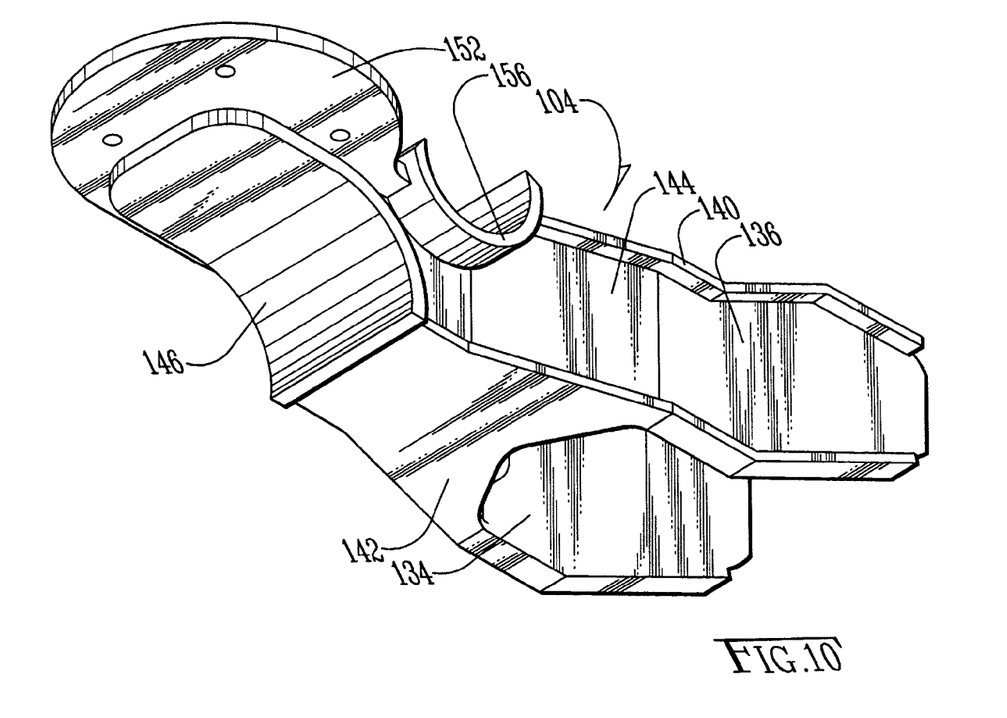
FIG. 10 is a partial perspective view of an embodiment of the inventive suspension beam assembly.
Figure 11:
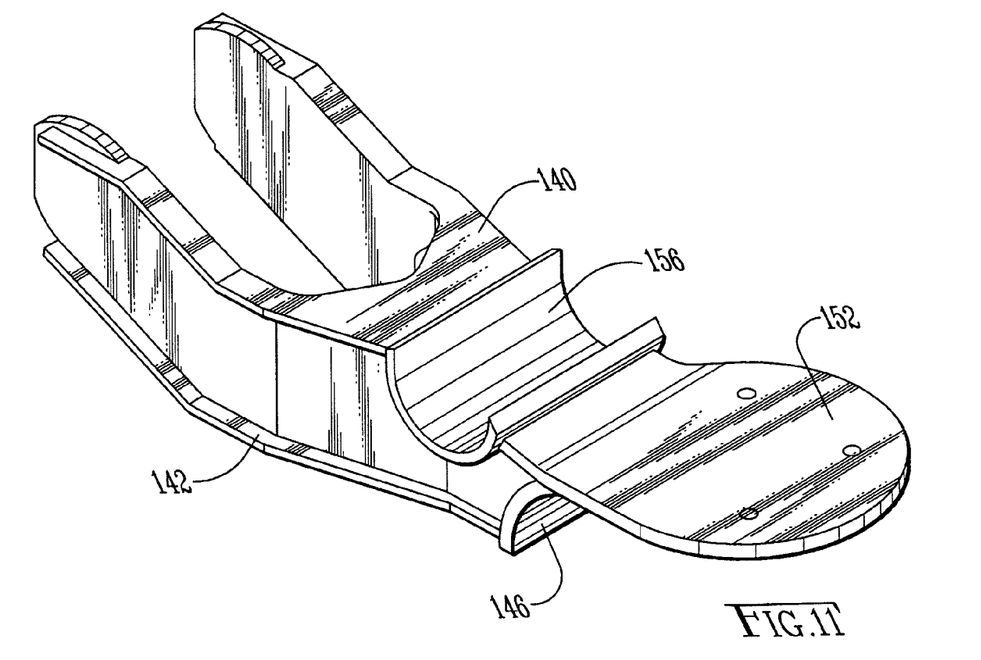
FIG. 11 is a partial perspective view of an embodiment of the inventive suspension beam assembly.
Figure 12:
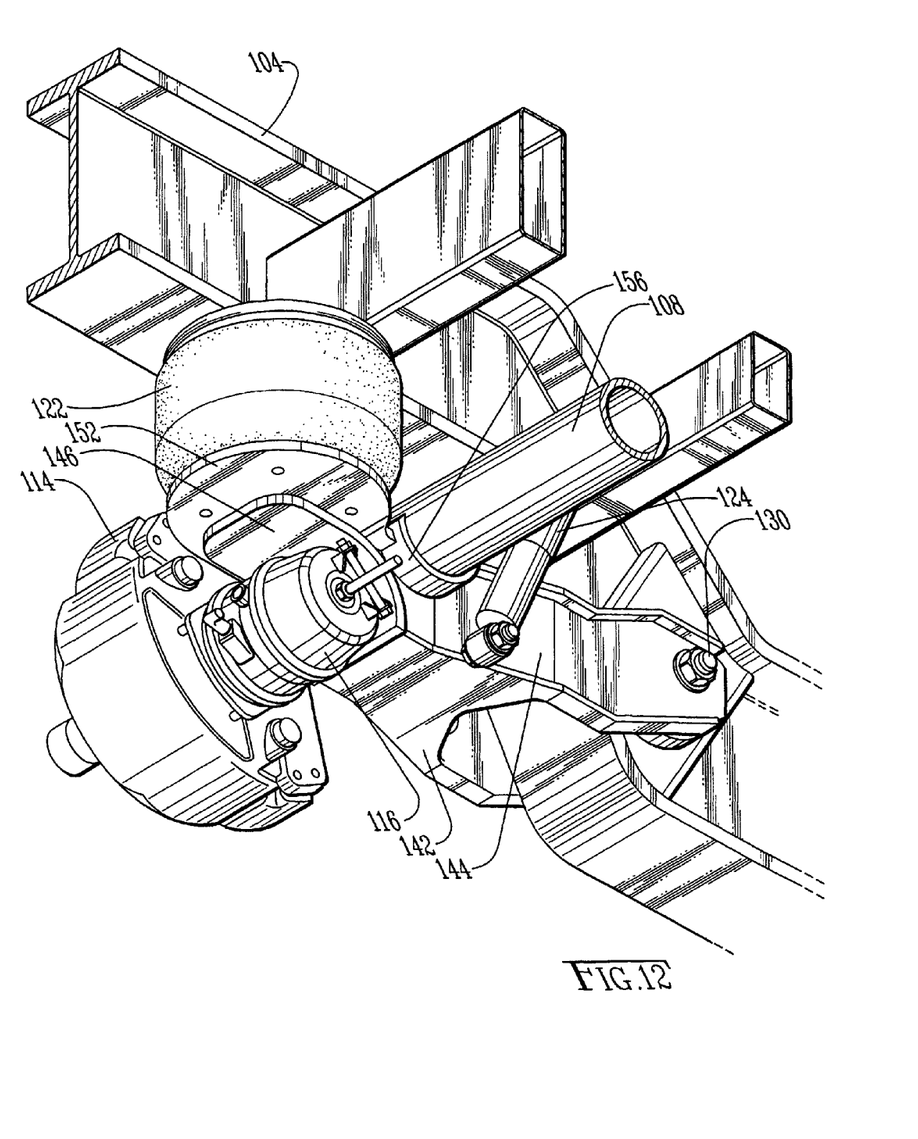
FIG. 12 is a perspective view of an embodiment of the inventive suspension beam assembly.

Referring now to FIGS. 5-9 and 12, additional perspective and cross-sectional views of the first embodiment of the suspension beam assembly are depicted. Referring now to FIG. 6, a cross-sectional view of an embodiment of the suspension assembly is depicted along the C-C axis depicted in FIG. 5. Referring now to FIG. 7, a cross-sectional view of an embodiment of the suspension assembly is depicted along the D-D axis depicted in FIG. 5. FIGS. 10 and 11 depict the first embodiment of the suspension beam apart from the suspension beam assembly.

It is to be understood that the suspension system includes two suspension beams and beam assemblies, one positioned on either side of the vehicle with the axle spanning transversely across both beam assemblies. Any description provided herein of the trailing arm assembly applies to the mirror image suspension beam positioned at the other side of the vehicle.

Having specifically described illustrative embodiments of the invention with reference to the accompanying drawings, it is to be understood that the invention is not limited to those precise embodiments and that various changes and modifications may be affected therein by one skilled in the art without departing from the scope and spirit of the invention as defined in the appended claims.

What is claimed is:

1. A suspension beam for a suspension assembly having an axle with a disk brake assembly and an air brake actuator attached thereto, the suspension assembly attached to a vehicle frame, the suspension beam comprising:
   a beam body having a first end and a second end, the first end of the beam body provided with a pivotal attachment for connecting to a vehicle frame;
   an air spring mounting plate attached to an upper surface of the beam body adjacent to the second end of the beam body;
   an axle seat attached to the upper surface of the beam body for mounting an axle substantially perpendicular to the beam body; and
   a brake actuator clearance plate attached to the beam body substantially below the air spring mounting plate for providing clearance for an air brake actuator directly attached to a disk brake assembly;
   wherein the brake actuator clearance plate comprises a vertical plate attached to a side of the beam body, wherein the vertical plate is provided with an opening therein to provide clearance for an air brake actuator; and
   wherein the brake actuator clearance plate extends around the opening to provide impact protection to an air brake actuator disposed therein.

2. A suspension beam for a suspension assembly having an axle with a disk brake assembly and an air brake actuator attached thereto, the suspension assembly attached to a vehicle frame, the suspension beam comprising:
   a beam body having a first end and a second end, the first end of the beam body provided with a pivotal attachment for connecting to a vehicle frame;
   an air spring mounting plate attached to an upper surface of the beam body adjacent to the second end of the beam body;
   an axle seat attached to the upper surface of the beam body for mounting an axle substantially perpendicular to the beam body; and
   a brake actuator clearance plate attached to the beam body substantially below the air spring mounting plate for providing clearance for an air brake actuator directly attached to a disk brake assembly;
   wherein the pivotal attachment of the first end of the beam body comprises a yoke having a first arm and a second arm for positioning on either side of a vehicle frame.

3. A suspension beam for a suspension assembly having an axle with a disk brake assembly and an air brake actuator attached thereto, the suspension assembly attached to a vehicle frame, the suspension beam comprising:
   a beam body having a first end and a second end, the first end of the beam body provided with a pivotal attachment for connecting to a vehicle frame;
   an air spring mounting plate attached to an upper surface of the beam body adjacent to the second end of the beam body;
   an axle seat attached to the upper surface of the beam body for mounting an axle substantially perpendicular to the beam body; and
   a brake actuator clearance plate attached to the beam body substantially below the air spring mounting plate for providing clearance for an air brake actuator directly attached to a disk brake assembly;
   wherein the beam body comprises a pair of side plates, a top plate and a bottom plate fastened together to form a beam box having a substantially rectangular cross section; wherein the axle seat is attached to the top plate and the side plates at a point between the first and second ends of the beam body; wherein the air spring mounting plate is attached to a top edge of the side plates adjacent to the second end of the beam body; and wherein the brake actuator clearance plate comprises a semi-arcuate end plate attached to the second end of the beam body and the air spring mounting plate.

4. A suspension beam for a suspension assembly having an axle with a disk brake assembly and an air brake actuator attached thereto, the suspension assembly attached to a vehicle frame, the suspension beam comprising:
   a beam body having a first end and a second end, the first end of the beam body provided with a pivotal attachment for connecting to a vehicle frame;
   an air spring mounting plate attached to an upper surface of the beam body adjacent to the second end of the beam body;
   an axle seat attached to the upper surface of the beam body for mounting an axle substantially perpendicular to the beam body; and
   a brake actuator clearance plate attached to the beam body substantially below the air spring mounting plate for providing clearance for an air brake actuator directly attached to a disk brake assembly;
   wherein the beam body comprises an I-beam having a vertical plate, top plate and bottom plate and having an I-shaped cross section; and wherein the axle seat is attached to the top plate at a point between the first and second ends of the beam body; wherein the brake actuator clearance plate is attached to the vertical plate of the I-beam; and wherein the brake actuator clearance plate comprises a vertical plate provided with an opening therein to provide clearance for an air brake actuator.

5. The suspension beam of claim 3 wherein a portion of the side plates extend between the beam end plate and air spring mounting plate to form a web.

6. A suspension beam for a suspension assembly for a vehicle having a chassis and an axle with an air brake actuator attached thereto, the suspension beam comprising:

a top plate, a bottom plate, and at least one vertical plate joining the top plate and the bottom plate, the suspension beam having a first end pivotally connected to a chassis;

a brake actuator clearance plate attached to at least one of the top, bottom or vertical plates, the brake actuator clearance plate shaped to provide clearance for an air brake actuator;

an axle seat attached to at least one of the plates between the first and second ends of the suspension beam; and an air spring mounting plate attached to the brake actuator plate and at least one of the top, bottom or vertical plates at a second end of the suspension beam.

7. The suspension beam of claim 6 wherein the brake actuator clearance plate comprises an end plate attached to an end of the top, bottom and at least one side plates and extending beneath the air spring mounting plate.

8. The suspension beam of claim 7 wherein the first end of the suspension beam is provided with a yoke having a first and a second arm for pivotal attachment to a chassis.

9. The suspension beam of claim 7 wherein the first end of the suspension beam is provided with a hole and bushing for pivotal attachment to a chassis.

10. The suspension beam of claim 6 wherein the brake actuator clearance plate comprises a side plate attached to one of the at least one vertical plates and extends beneath the air spring mounting plate, wherein the side plate is provided with an opening beneath the air spring mount to provide clearance for an air brake actuator.

11. The suspension beam of claim 9 wherein the side plate of the brake actuator clearance plate extends around the opening to provide impact protection to an air brake actuator disposed therein.

12. The suspension beam of claim 11 wherein the first end of the suspension beam is provided with a yoke having a first and a second arm for pivotal attachment to a chassis.

13. The suspension beam of claim 11 wherein the first end of the suspension beam is provided with a hole and bushing for pivotal attachment to a chassis.

14. A suspension beam for a suspension assembly for a vehicle having a frame and an axle, the axle having an air brake actuator attached thereto, the suspension beam comprising:

a first end for pivotal attachment to a frame of a vehicle;

an air spring mounting plate disposed at a second end of the suspension beam;

an arcuate end plate disposed beneath and attached to the air spring mounting plate for providing clearance to an air brake actuator;

a bottom plate extending from the first end of the suspension beam to the arcuate end plate;

two side plates extending from the first end of the suspension beam to the arcuate end plate, and disposed at an angle to the bottom plate, each side plate attached to the bottom plate along a bottom edge thereof, to the arcuate end plate along an end thereof and to the air spring mounting plate along a portion of a top edge thereof;

an axle seat attached to a top edge of each side plate and to an edge of the air spring mounting plate;

a top plate extending from the first end of the suspension beam to the axle seat, the top plate attached to a top edge of the two side plates, forming with the side plates and the bottom box a hollow beam.

15. The suspension beam of claim 14 wherein the first end of the suspension beam comprises two arms formed from the two side plates and the top and bottom plates for pivotal attachment to a vehicle frame.

16. The suspension beam of claim 14 wherein the pivotal attachment comprises a hole and bushing provided in the two side plates adjacent to the first end of the suspension beam.

* * * * *